United States Patent [19]

Marini et al.

[11] Patent Number: 5,106,234
[45] Date of Patent: Apr. 21, 1992

[54] METHOD AND DEVICE FOR THE CONSTRUCTION AND/OR THE RECONDITIONING OF PIPELINES AND CONDUITS

[76] Inventors: Ermenegildo Marini; Roberto Marini, both of 10, Via Lombroso, Padova, Italy

[21] Appl. No.: 511,085

[22] Filed: Apr. 19, 1990

[30] Foreign Application Priority Data

May 5, 1989 [IT] Italy .................. 12483 A/89

[51] Int. Cl.⁵ ............................................ F16L 55/18
[52] U.S. Cl. .................................... 405/154; 405/146
[58] Field of Search ............. 405/154, 146, 156, 289; 156/287, 87; 138/97

[56] References Cited

U.S. PATENT DOCUMENTS

| | | | |
|---|---|---|---|
| 2,745,778 | 5/1956 | Garten | 156/287 X |
| 2,861,429 | 11/1958 | Duncan | 405/289 |
| 3,376,180 | 4/1968 | Larson et al. | 156/287 |
| 3,662,045 | 5/1972 | Tierling | 405/146 X |
| 4,053,343 | 10/1977 | Carter | 156/287 X |
| 4,602,974 | 7/1986 | Wood et al. | 156/287 |
| 4,770,562 | 9/1988 | Muller et al. | 405/154 |

FOREIGN PATENT DOCUMENTS

| | | | |
|---|---|---|---|
| 2083125 | 4/1987 | Japan | 156/287 |
| 1039836 | 8/1966 | United Kingdom | 156/287 |
| 1205170 | 9/1970 | United Kingdom | 156/287 |
| 2018384 | 10/1979 | United Kingdom | 156/287 |

*Primary Examiner*—Dennis L. Taylor
*Attorney, Agent, or Firm*—Larson and Taylor

[57] ABSTRACT

A method and a device for the construction and/or the reconditioning of pipelines and conduits, by applying or forming around a sheath of impervious flexible material, a tubular member made from fabric or glass fibers or any other suitable material impregnated with a hardening resin. The impregnated tubular member is expanded and shaped by means of at least one expander formed by a tubular ring of resilient flexible material, of cylindrical shape, which has been pressurized so as to cause a fluid-tight squashing of its axial bore. By exerting a hydraulic or pneumatic pressure against one end of said expander, the latter is advanced along said tube with a rotary-translatory motion.

16 Claims, 8 Drawing Sheets

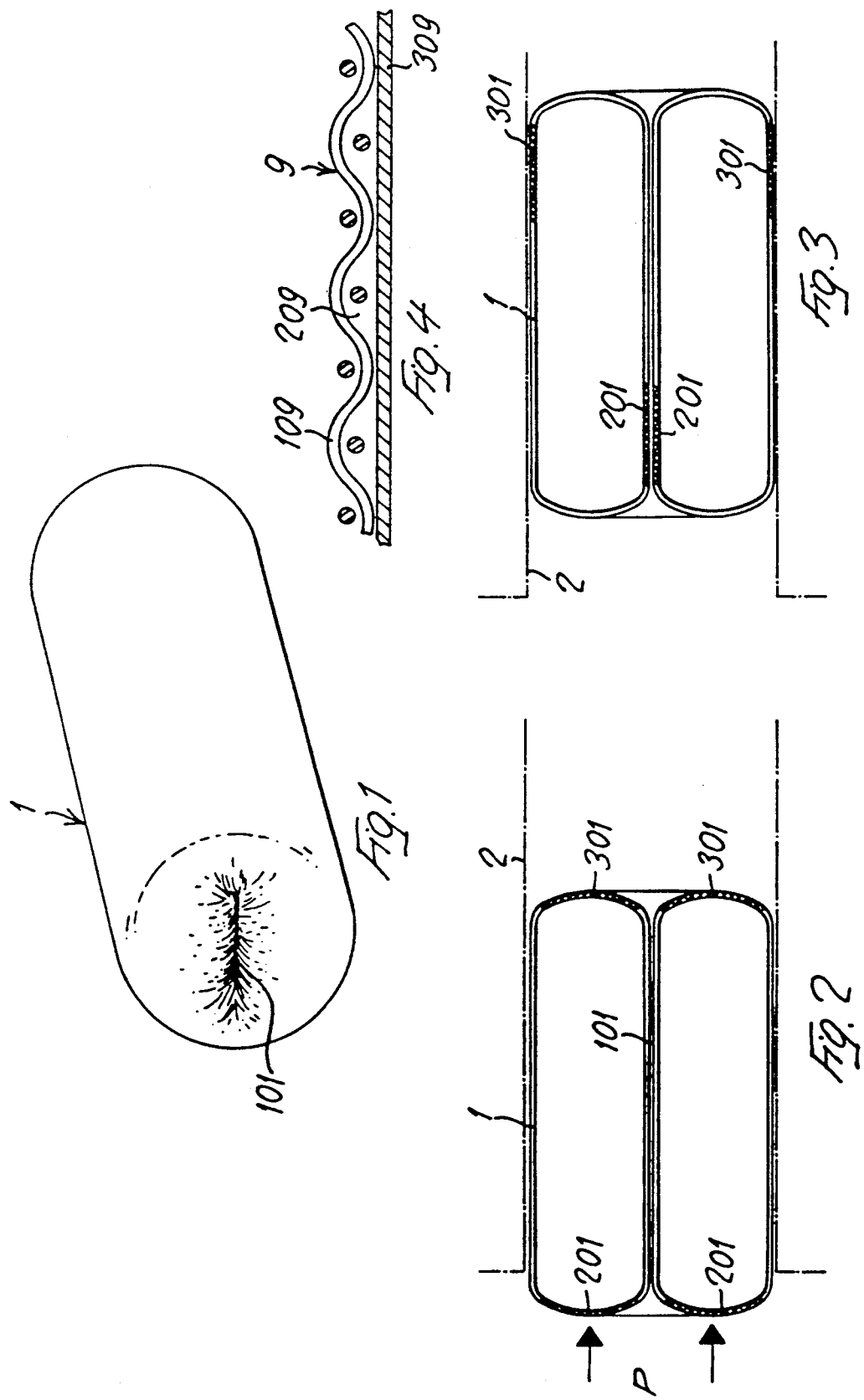

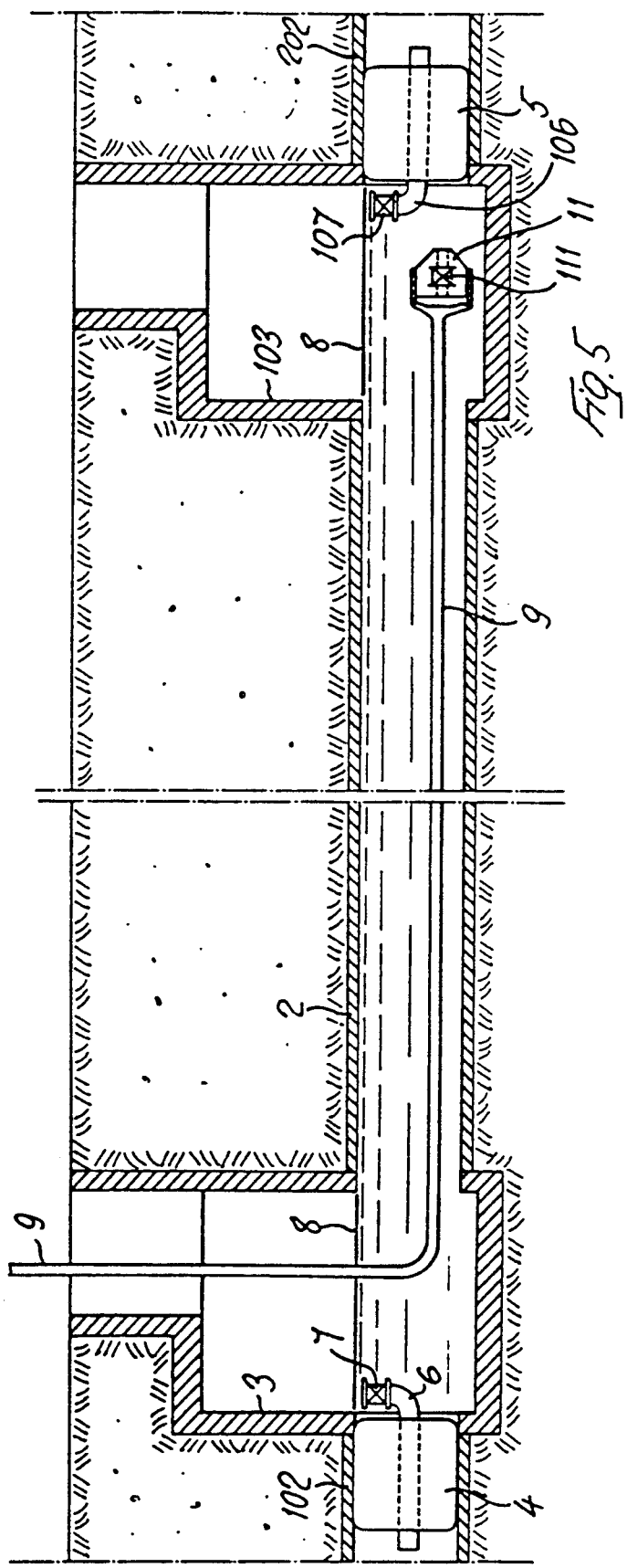

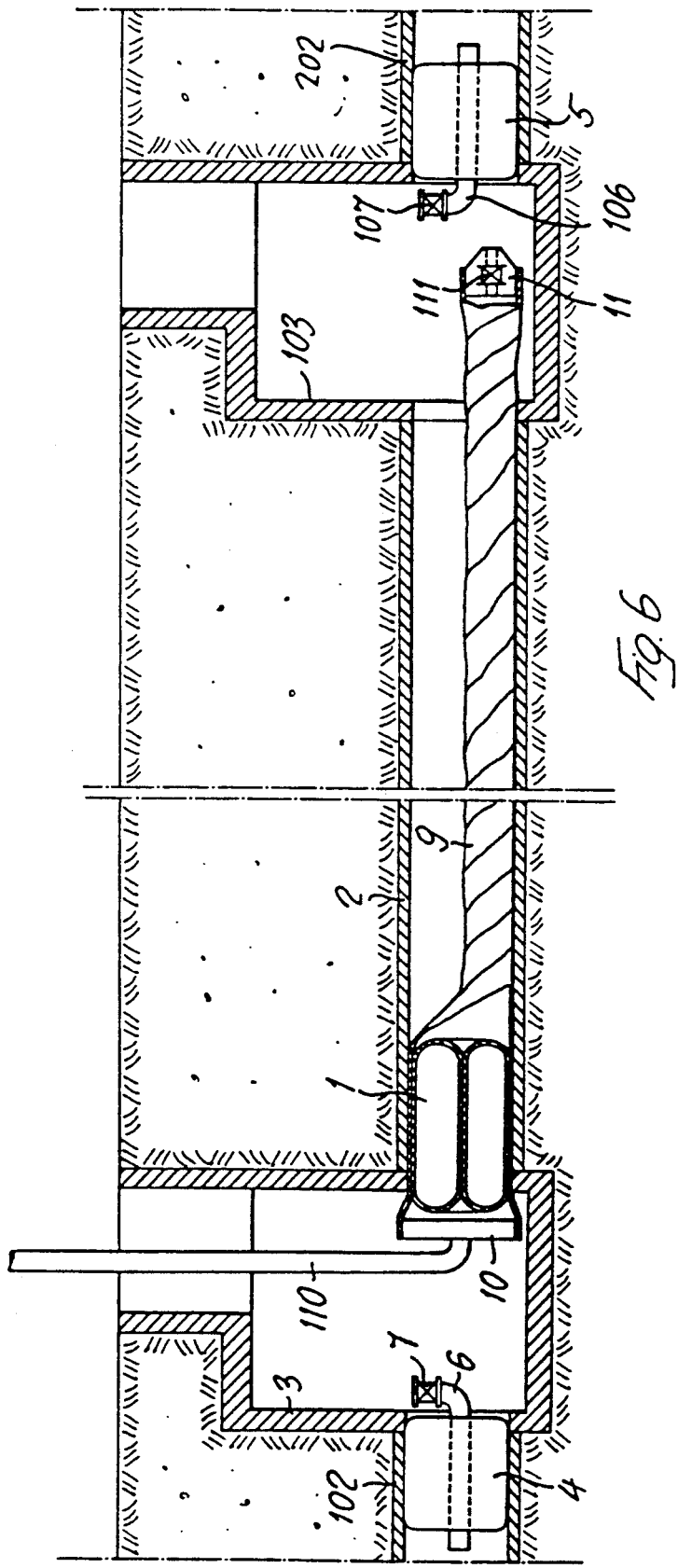

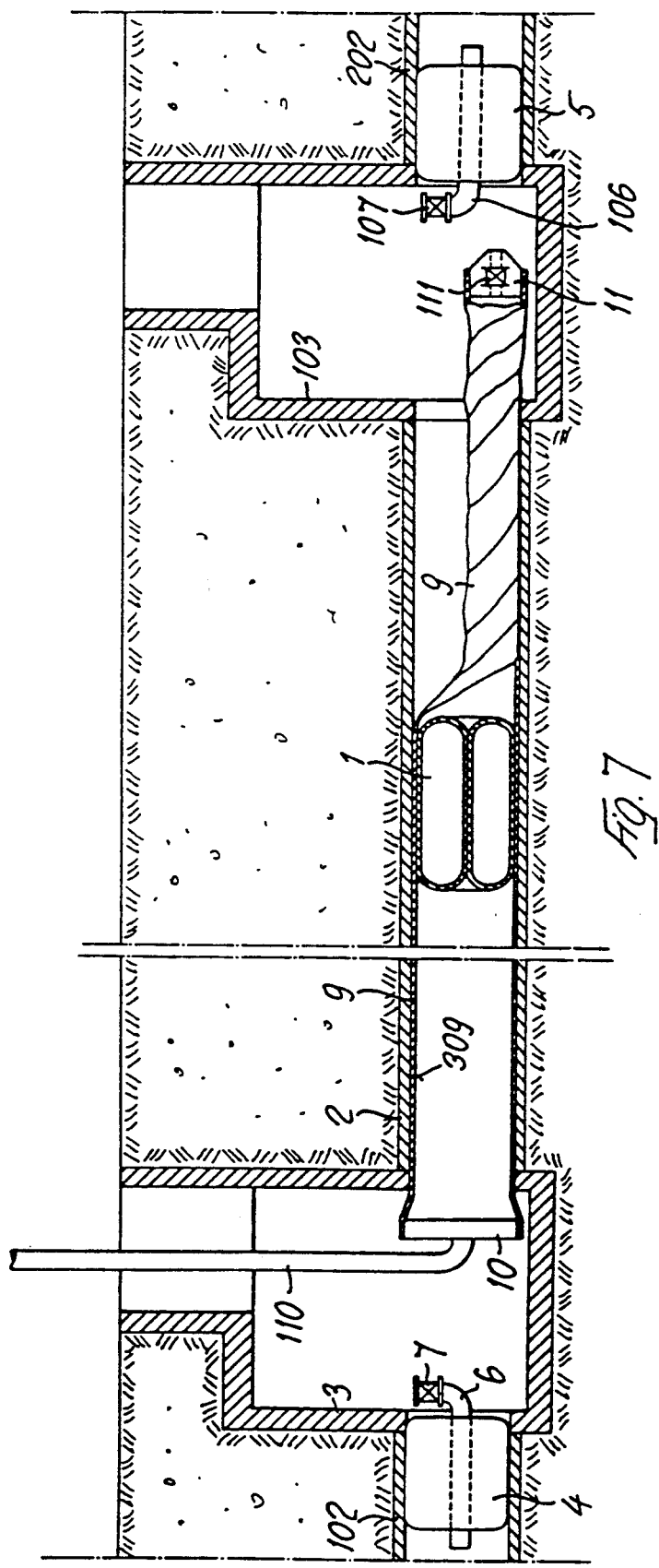

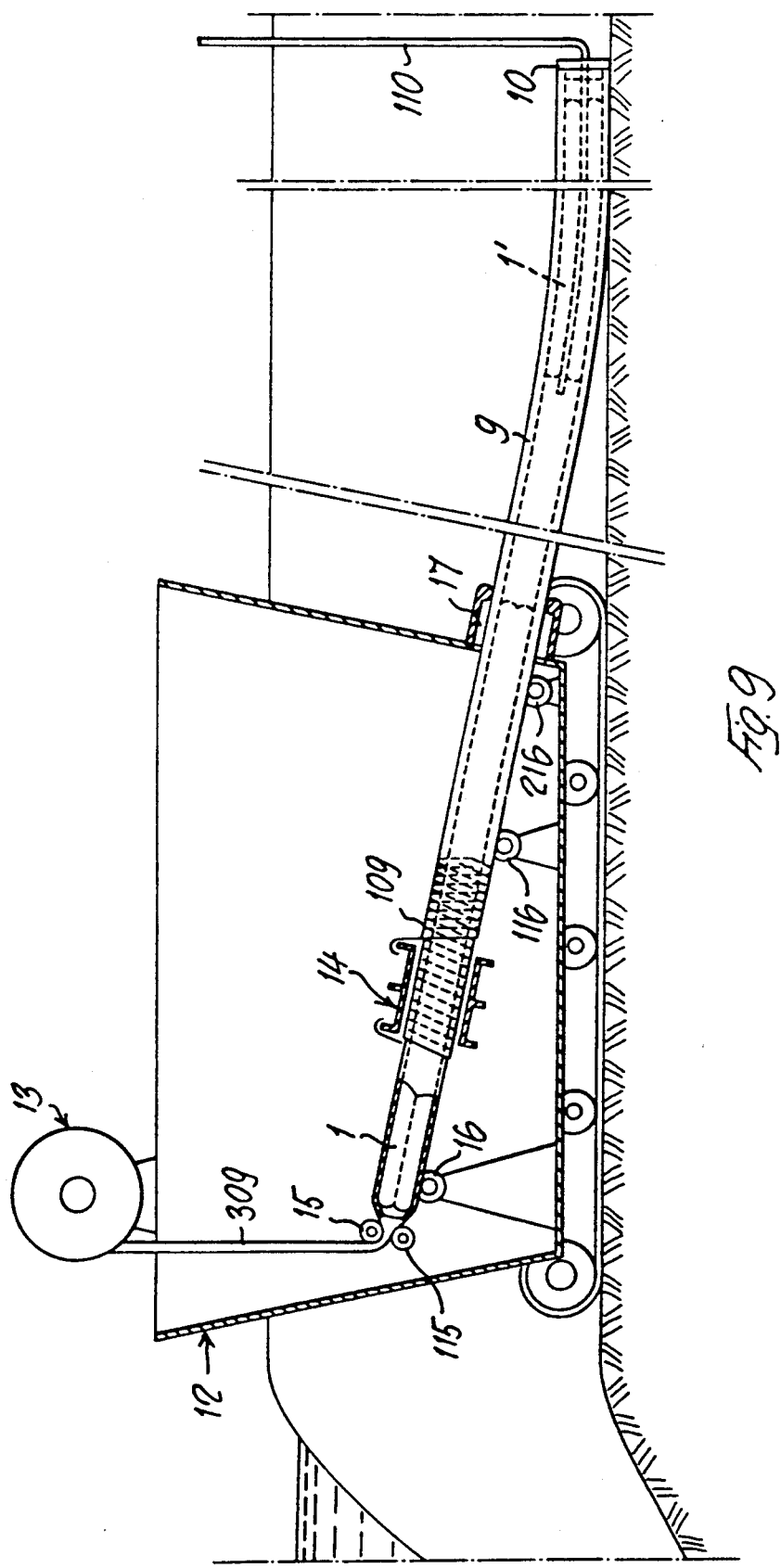

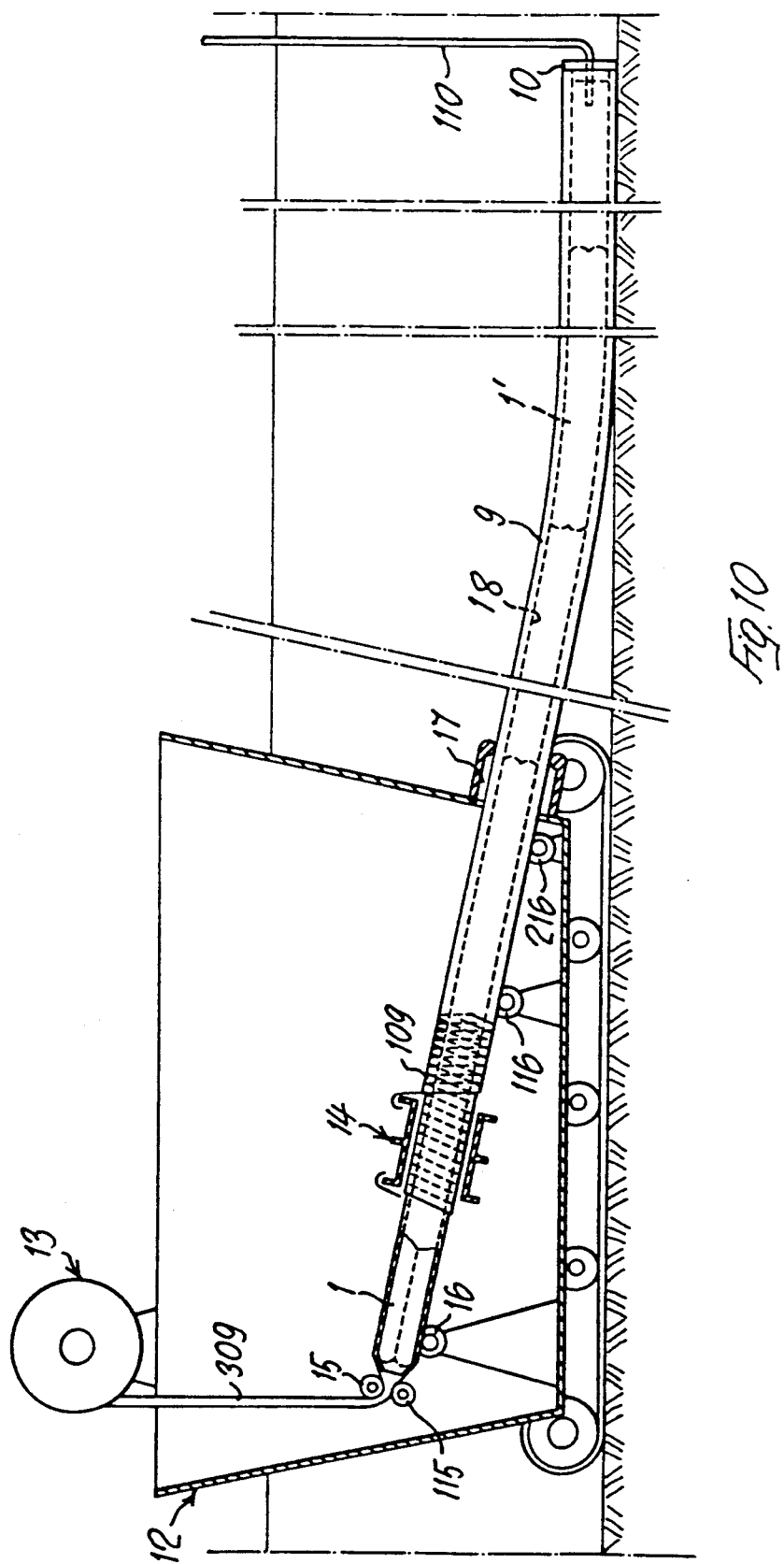

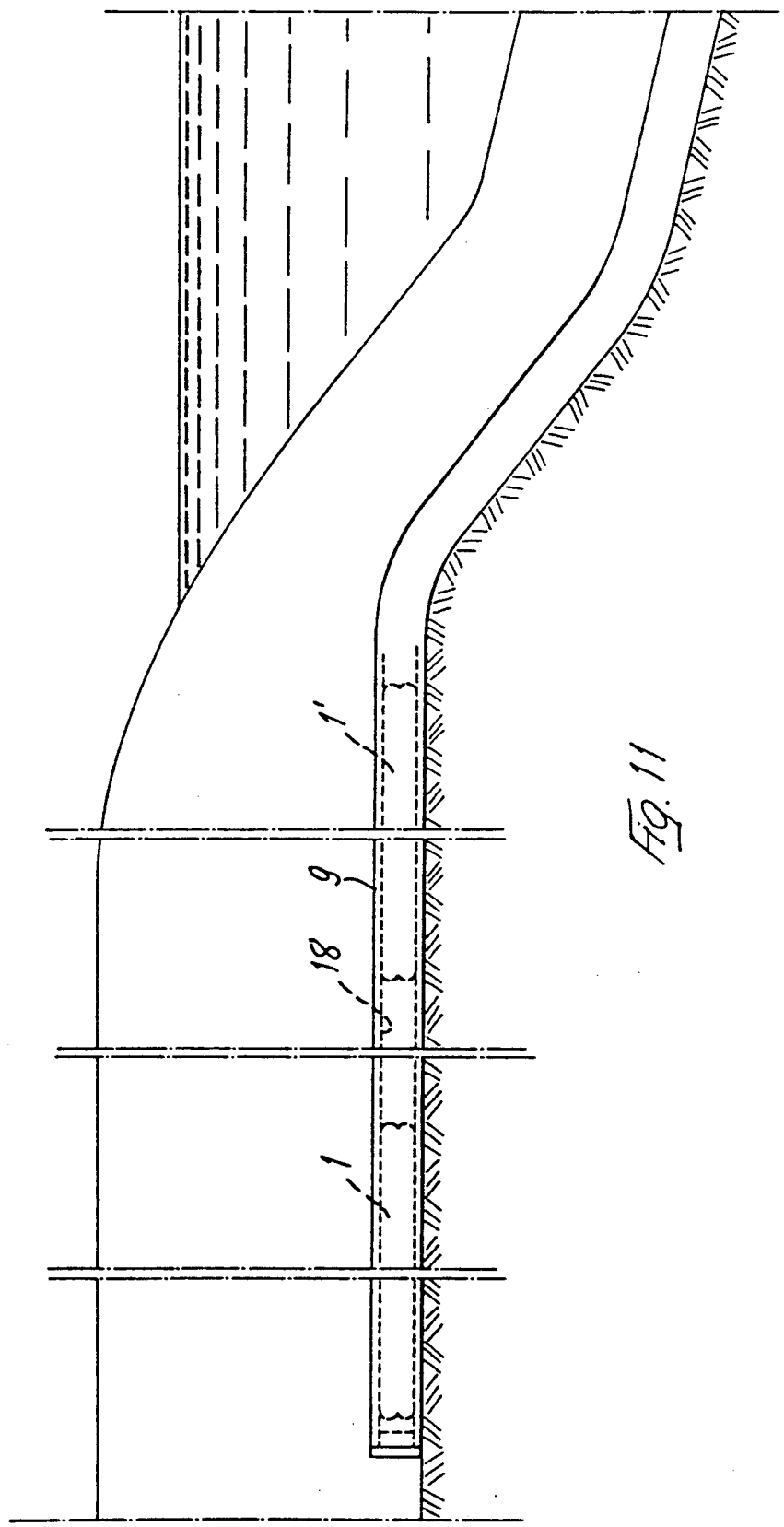

METHOD AND DEVICE FOR THE CONSTRUCTION AND/OR THE RECONDITIONING OF PIPELINES AND CONDUITS

BACKGROUND AND SUMMARY OF THE INVENTION

One of the objects of the present invention is a method of reconditioning pipes and conduits such as, for example, sewage mains, pipelines, ducts, water mains, gas mains, tunnels or the like, hereinafter referred to collectively as "conduits," by lining the inner walls thereof with a tube made of fabric impregnated with a hardenable resin.

Methods of lining of this type are known in the art.

All these known prior art methods have the disadvantage that, due to any unevenness in the wall of a conduit to be reconditioned, or due to curves or drain-traps along the extend of the conduit, the application of the fabric tube is difficult.

A further object of the present invention is a method for the construction of new pipes and conduits, such as for instance underwater, underground or surface conduits and pipelines, by the expansion of a tubular impermeable sheath, and the concurrent lining of the external surface of said sheath by winding on it a fabric or a continuous glass fibers layer impregnated with a hardenable resin.

At the present time, pre-formed pipe sections are used to construct the conduits and the pipe sections which are assembled together during the laying operation. Alternatively, extruded pipes can be used to construct the conduits.

The above prior art methods have the disadvantage, particularly with respect to the construction of underwater pipelines and conduits, that they are easily subject to the danger of failures, which could occur during the launch, especially on occasion of consistent sea waves.

The present invention aims to obviate to the above and other disadvantages of the prior art methods, by providing a monolithic pipeline, exempt from joints and, as the underwater pipelines are concerned, from the danger of failures due to the sea waves.

According to a characteristic of the present invention, an impervious sheath of PVC or the like material, is wound on his external surface with a lining formed by a fabric and/or by continuous fibers of glass or other suitable materials, impregnated with a hardening resin. Inside of said sheath at least one expander member is inserted, which expander is formed by a tubular ring of cylindrical shape, of resilient, flexible impervious material, which is pressurized so as to cause a fluid-tight engagement of the surfaces of its inner axial bore. Thereafter a pressure is exerted by means of a pressurized fluid against one side of said expander, whereby the latter is caused to advance along the opposite side of the conduit with a rotary-traslatory motion like a cylindrical crawler track, thus exerting a uniform and homogeneous pressure against the walls of the pipeline forming sheath.

The force whereby the expander presses the tube impregnated with hardenable resin may be varied by adjusting the inflating pressure of the expander.

BRIEF DESCRIPTION OF THE DRAWINGS

Further characteristics and advantages of the method and device according to the invention will become more apparent from the following description, made with reference to the accompanying drawings, wherein:

FIG. 1 is a perspective view of the expander according to the invention.

FIGS. 2 and 3 are diagrammatic, longitudinal sectional views showing how the expander of FIG. 1 behaves while being advanced in a conduit.

FIG. 4 shows an enlarged detail of a section of a composite tube made of a fabric and an impervious sheet, used for lining a conduit.

FIG. 5 shows the step of introduction of a resin-impregnated tubular member, provided with a terminal head, into the section of a conduit to be lined.

FIGS. 6 to 8 show the three successive steps of the method of lining a section of conduit according to one embodiment of the invention.

FIG. 9 shows diagrammatically, in longitudinal section, the first step of the process according to another embodiment of the invention, for the construction of a new pipeline.

FIG. 10 is a view similar to that of FIG. 9, showing an intermediate step of the process of construction of a new pipeline, and FIG. 11 shows the final step of the process according to FIGS. 9 and 10.

DESCRIPTION OF A FIRST EMBODIMENT OF THE INVENTION

Figure 8:
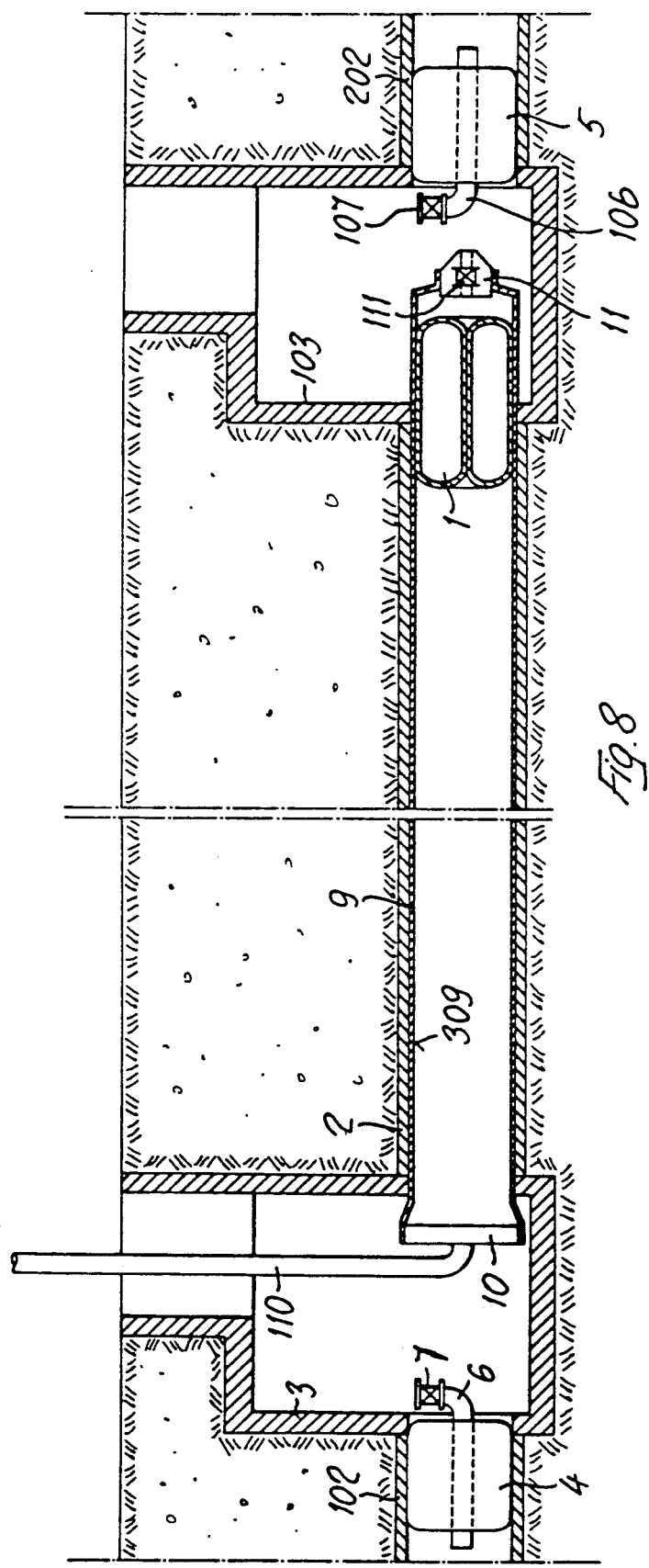

With reference to the drawings, and more particularly to FIGS. 1 to 3 thereof, the expander device 1 according to the invention comprises a tubular ring of substantially cylindrical shape, made of resilient, flexible material, impervious to air and liquids, the inner pressure of which may be raised by inflation to such a level as to cause the walls of its axial inner bore 101 to sealingly contact each other.

If the expander described above is introduced sealingly into a tubular conduit 2 and a pressure P is exerted against an end thereof, e.g. by means of a pressurized fluid, the walls of the expander move with a rotary-translatory motion along the contacting side of the conduit 2 so that, for example, the hatched portions 201 (FIGS. 2 and 3) move from the bottom of the annular body 1 to the interior of the axial bore 101, while the portions 301 move from the opposite bottom of the annular body 1 to a position adjacent the walls of the conduit 2, with a motion similar to that of a cylindrical crawler track. Thus, the expander 1 is advanced at the desired speed and with no friction with respect to the walls of the conduit 2, from one end to the opposite end of the conduit 2.

By suitably selecting the inflating pressure of the expander 1 (and, obviously, its diameter), the optimum pressure of the expander 1 against the walls of the conduit 2 may be obtained.

The method of lining the walls of a conduit according to the invention will be described hereinafter with reference to FIGS. 5 to 8 of the accompanying drawings.

With particular reference to FIG. 5 of the drawings, the numeral 2 indicates the conduit section to be lined. In the illustrated case, said conduit section 2 is a portion of a sewage mains comprising a conduit section 102 upstream of the conduit section 2 and separated therefrom by a drain-trap 3 open to the exterior, and a conduit section 202 downstream of the conduit section 2 and separated therefrom by a drain-trap 103 open to the exterior, all in a thoroughly usual fashion.

In the preliminary step of the operation, after thoroughly cleaning the conduit section 2, the outlet of the conduit section 102 and the inlet of the conduit section 202 are closed by pneumatic plugs 4, 5 through which there passes a respective short pipe section 6, 106 provided with a stop valve 7, 107 at the end that opens into the drain-traps 3, 103.

The conduit section 2 is then flooded and the level 8 of the water depends on the level of the inlet of the valve 107 on the discharge pipe 106 which acts as a skimmer.

Once the conduit section 2 has been flooded, the resin-impregnated fabric tube 9 provided with a terminal head 11 is introduced thereinto. Said tube 9, as best shown in FIG. 4, comprises a layer of fabric 109 impregnated with a suitable hardenable resin 209 and provided on the inner side thereof with a tubular sheath 309 made of PVC or similar material, having the same diameter, which constitutes the element which is impervious to air and fluids. Said sheath 309, as described below, may be recovered when the conduit reconditioning operation is over.

The tube 9 is impregnated with resin just before being introduced into the drain-trap 3 and then into the conduit 2, and the impregnation is carried out by means of any suitable equipment, not shown because it does not form a part of the present invention.

Alternately, the tube 9 may be formed by a tubular sheath 309 of PVC or the like, lined on its other side with one or more layers of glass fibers 109 soaked with a hardenable resin, and the said lining may be formed during the construction of the pipeline, as will be described later.

Before being introduced into the drain-trap, the tube 9 is provided, preferably, with a terminal head 11 equipped with a valve 111.

Once the tube 9 has been stretched in the conduit 2, the skimmer 107 will drain the flooding water from the conduit 2 via the pipe 106 during the successive working steps.

Thereafter, the expander 1, which was inflated at the required operating pressure, is introduced into one end of the sheath 309 of the tube 9, and a head 10 is sealingly applied to said end of the tube 9. As shown, the head 10 is provided with a pipe 110 communicating, at one end, with the interior of the tube 9, upstream of the expander 1 and, at the other end, with the outside, for example, with the delivery side of an air compressor (not shown).

The operation of the device described above is now apparent. By admitting pressure, through the pipe 110 and head 10, into the tube 9 upstream of the expander 1, the latter is pushed, as shown in FIGS. 7 and 8, through the entire sheath 309 of the tube 9, whereby the resin-impregnated fabric tube 109 is firmly pressed against the walls of the conduit 2. The pressurized air (or water) admitted through the pipe 110 maintains the sheath 309 under pressure also when the expander 1 has passed and, therefore, the tube 109 impregnated with resin 209 is maintained thereby adhering to the conduit 2 for the desired lapse of time. When the expander 1 arrives at the terminal plug 11, the step of expanding the fabric tube and the adhering of said tube to the inner surface of the conduit to be reconditioned is over.

Once the resin 209 has cured, the expander 1, the heads 10 and 11 and possibly the sheath 309 are recovered.

DESCRIPTION OF A SECOND EMBODIMENT OF THE INVENTION

Having now reference to FIGS. 9 to 11, the embodiment of the process will be described as applied to the construction of new pipelines, and more particularly to the construction of an underwater pipeline.

Numeral 12 designates a yard structure (in the example shown a self-propelled structure) housing the bobbin 13 on which the sheath 309 made of impermeable and flexible material (and for instance a PVC tubular sheath) is wound. Said sheath will constitute the inner wall of the pipe 9 which will be formed. The structure 12 houses also a device 14 for winding around the sheath 309 one (or more) layers of glass fibers, fabric or other suitable materials, soaked or impregnated with a hardenable resin, which, once the resin has cured, will form the outer strong shell 109 of the sheath 309. The device 14 may be of any suitable kind, and is shown only diagrammatically in the drawings. The sheath 309 is unwound from the bobbin 13 by a motor-driven rollers assembly 15-115, and is inserted on the leading end of the expander 1. The expander extends, advantageously, for the whole length of the structure 12, inside of which it is supported with a slight inclination toward the bottom, by a set or supporting rollers 16, 116, 216 and its trailing end projects outside of the structure 12 through the passage 17. After having passed over the leading end of the expander 1, the sheath 309 is covered in correspondence of the intermediate portion of said expander by winding on it one or more layers 109 of glass fibers soaked with resin, after which the thus formed pipe 9 is advanced along the expander 1 to the exterior through the opening 17. Inside of the thus formed pipe a second expander 1' is inserted, and the end of the pipe 9 is closed by means of the head piece 10. The head piece 10 is centrally bored, so as to allow the passage of the hose 110, in an air-tight manner. In the first step of the operation of the device, the hose 110 is passed through the axial passage of the expander 1', so as to open into the space of the pipe 9 comprised between the expanders 1 and 1'. The said first step terminates when the hardening process of the resin soaking the pipe section 9 in the region of the expander 1' is practically completed, so that the said pipe section is self-supporting. At this moment, the end of the hose 110 is withdrawn from the expander 1', and is moved back in the direction of the head 10, so as to be arranged between the head 10 and the expander 1', as shown in FIG. 10. With the withdrawal of the hose 110, the axial inner passage of the expander 1' is again closed in an airtight manner, so that the expander 1 will be separated from the expander 1' by a pipe section 9 enclosing a compressed air cushion 18, whilst the compressed air which is fed through hose 110 will now act on the rear side of the expander 1', between the said expander 1' and the head piece 10, thus maintaining under pressure the section of the pipe 9 which is being formed, after the movement of the expander 1', thus assuring the perfect adherence of the sheath 309 to the outer winding 109.

By proceeding in the operation of construction of the pipeline 9, the pressure acting in the pipe section between the expander 1' and the head piece 10 will cause the expander 1' to progress along the pipe 9. The progress of the expander 1' will be transmitted, through the air cushion 18, to the expander 1, which will in turn "progress" along the sheating 309 which is fed by the roller 13, thus bringing forward the operation of formation of the pipeline 9, up to completion of the desired pipeline length. In FIG. 11 the final step of this operation is shown, in which the leading end of the pipeline 9 has returned to the surface.

In the appended claims, by the term "fabric" any fabric made of natural or artificial fibers is intended, by the term "fiber" any natural or artificial fibers are intended, either organic or inorganic in nature, like glass fibers, textile fibers, or plastics fibers, and by the term "resin" any artificial hardenable resin is intended, which may be cured at ambient conditions.

We claim:

1. A method of reconditioning conduits by lining the inner walls thereof with a tube of fabric impregnated with a hardenable resin, said method comprising the steps of:

preparing the walls of a conduit to be reconditioned;

inserting into the conduit a fabric tube impregnated with a hardenable resin, the fabric tube comprising fabric or continuous fibers and having two open ends;

inserting an expander device into one end of the fabric tube, while within the conduit, the expander device comprising an axial inner bore having walls and a tubular ring of resilient, flexible, and impervious material which is pressurized with a gas or a fluid to cause the walls of the axial inner bore to sealingly contact each other;

inserting an upstream head and a downstream head into respective ends of the fabric tube to close the fabric tube, the upstream head including a first pipe extending therethrough for connecting to a source of pressurized fluid, the downstream head including a second pipe extending therethrough for communicating with the atmosphere; and forcing the pressurized fluid from the source of pressurized fluid through the first pipe to apply pressure against an end of the expander device to advance the expander device with a rotary-translatory motion through the fabric tube, thereby pressing the fabric tube against the walls of the conduit to be reconditioned.

2. The method of claim 1, wherein the downstream head is inserted into the fabric tube before the fabric tube is inserted into the conduit and wherein the downstream head includes a valve for communicating with the atmosphere.

3. The method of claim 1, wherein the fabric tube includes an impervious tubular sheath on the inner side thereof.

4. The method of claim 3, wherein the tubular sheath comprises PVC.

5. The method of claim 3, further comprising the step of recovering the tubular sheath after the hardenable resin has hardened.

6. The method according to claim 1, wherein the fabric tube is impregnated with the hardenable resin immediately before or while the fabric tube is being inserted into the conduit.

7. The method of claim 1, wherein prior to said insertion of the fabric tube into the conduit, the conduit is at least partially flooded with water.

8. The method of claim 1, wherein the fabric tube comprises a tube of glass fibers.

9. The method of claim 1, wherein the hardenable resin comprises an artificial resin which is curable at ambient conditions.

10. A method for the construction of underwater, underground or surface pipelines by the expansion of an impervious tubular sheath and the concurrent winding on the tubular sheath of a fabric tube which is impregnated with a hardenable resin, said method comprising the steps of:

inserting first and second expander devices into a tubular sheath at a free end thereof, each of the expander devices comprising an axial inner bore having walls and a tubular ring of resilient, flexible, and impervious material which is pressurized with a gas or a fluid to cause the walls of the axial inner bore to sealingly contact each other;

closing the free end of the tubular sheath with a head piece, the head piece including a pipe connected to a source of pressurized fluid or gas;

feeding the tubular sheath toward a leading end of the first expander device while concurrently winding a fabric tube on an external surface of the tubular sheath, the fabric tube comprising fabric or fibers and being impregnated with a hardenable resin;

forcing pressurized fluid from a source of pressurized fluid into a space in the tubular sheath between the two expander devices to create a fluid cushion between the two expander devices, the fluid cushion maintaining a fixed distance between the two expander devices as the expander devices travel through the tubular sheath;

forcing pressurized fluid from the source of pressurized fluid through a pipe in the head piece and into a space in the tubular sheath between the second expander device and the head piece to apply pressure against an end of the second expander device and to thereby advance each of the two expander devices with a rotary-translatory motion through the tubular sheath, thereby pressing the fabric tube against the walls of the conduit to be reconditioned; and continuing the process of feeding the tubular sheath and winding the fabric tube onto the tubular sheath.

11. The method of claim 10, wherein the fabric tube is wound on the tubular sheath where the tubular sheath is supported by the first expander device.

12. The method of claim 10, wherein the fabric tube includes an impervious tubular sheath on the inner side thereof.

13. The method of claim 12, wherein the tubular sheath comprises PVC.

14. The method of claim 10, further comprising the step of recovering the tubular sheath after the hardenable resin has hardened.

15. The method of claim 10, wherein the hardenable resin comprises an artificial resin which is curable at ambient conditions.

16. The method of claim 10, wherein the fabric tube comprises a tube of glass fibers.

* * * * *